(12) United States Patent
Van Dingenen et al.

(10) Patent No.: US 11,773,914 B2
(45) Date of Patent: Oct. 3, 2023

(54) CLUTCH ASSEMBLY

(71) Applicant: Dana Belgium N.V., Bruges (BE)

(72) Inventors: Joachim Van Dingenen, Bruges (BE);
Tommy Van Acker, Bruges (BE);
Marc Van Tomme, Roeselare (BE);
Filip Schacht, Bruges (BE); Kurt D M Cattoor, Bruges (BE)

(73) Assignee: Dana Belgium N.V., Bruges (BE)

( * ) Notice: Subject to any disclaimer, the term of this patent is extended or adjusted under 35 U.S.C. 154(b) by 0 days.

(21) Appl. No.: 17/643,212

(22) Filed: Dec. 8, 2021

(65) Prior Publication Data

US 2022/0186788 A1    Jun. 16, 2022

(30) Foreign Application Priority Data

Dec. 11, 2020   (DE) .................. 20 2020 107 199.8

(51) Int. Cl.
*F16D 13/38*      (2006.01)
*F16D 13/52*      (2006.01)
*F16D 13/72*      (2006.01)
*F16D 13/74*      (2006.01)
*F16D 25/0638*    (2006.01)
*F16D 25/12*      (2006.01)
(Continued)

(52) U.S. Cl.
CPC .......... *F16D 13/385* (2013.01); *F16D 13/52* (2013.01); *F16D 13/70* (2013.01); *F16D 13/72* (2013.01); *F16D 13/74* (2013.01); *F16D 25/0638* (2013.01); *F16D 25/123* (2013.01); *F16D 2069/004* (2013.01); *F16D 2300/0214* (2013.01)

(58) Field of Classification Search
CPC ....... F16D 13/52; F16D 13/70; F16D 25/0638
See application file for complete search history.

(56) References Cited

U.S. PATENT DOCUMENTS 3,362,481 A * 1/1968 Steinhagen ......... F16D 25/0638
                                                192/106 F
3,612,237 A * 10/1971 Honda ................ F16D 25/0638
                                                192/106 F
(Continued)

FOREIGN PATENT DOCUMENTS

EP      1491792 A1 * 12/2004 ........... F16D 23/148
JP   2012211665 A     1/2012
(Continued)

*Primary Examiner* — Stacey A Fluhart
(74) *Attorney, Agent, or Firm* — Marshall & Melhorn, LLC

(57) ABSTRACT

A clutch assembly may have an axially slidable first plate, an axially fixed second plate disposed opposite the first plate, and a clutch pack arranged between the first plate and the second plate. The clutch pack may have a number of axially slidable consecutively arranged friction plates and separator plates. The assembly may also have an actuator axially movable between a first position and a second position, where, in the first position, the clutch pack is opened and, in the second position, the clutch pack is closed and the friction plates are frictionally engaged. The assembly may also have a return spring configured to bias the actuator in a direction away from the clutch pack towards the first position. The assembly may also have an engagement spring element configured to exert an elastic force on the clutch pack.

14 Claims, 4 Drawing Sheets

(51) Int. Cl.
*F16D 13/70* (2006.01)
*F16D 69/00* (2006.01)

(56) References Cited

U.S. PATENT DOCUMENTS

| | | | | |
|---|---|---|---|---|
| 3,746,138 | A * | 7/1973 | Forster | F16D 25/10 |
| | | | | 192/48.619 |
| 4,940,124 | A | 7/1990 | Galuska et al. | |
| 5,911,295 | A | 6/1999 | Itonaga et al. | |
| 6,920,971 | B2 * | 7/2005 | Creger | F16D 25/0638 |
| | | | | 192/85.41 |
| 7,481,306 | B2 * | 1/2009 | Nakagomi | F16D 25/082 |
| | | | | 192/70.15 |
| 2002/0014386 | A1 * | 2/2002 | Diemer | F16D 13/70 |
| | | | | 192/70.14 |
| 2003/0015392 | A1 * | 1/2003 | Shoji | F16D 25/0638 |
| | | | | 192/85.34 |
| 2004/0144614 | A1 * | 7/2004 | Ookita | F16D 25/0638 |
| | | | | 192/85.34 |
| 2015/0300310 | A1 | 10/2015 | Seillier | |
| 2017/0023072 | A1 | 1/2017 | Tanaka | |
| 2018/0119751 | A1 | 5/2018 | Wilton et al. | |
| 2019/0017556 | A1 | 1/2019 | Heuver | |

FOREIGN PATENT DOCUMENTS

| | | | | |
|---|---|---|---|---|
| KR | 20130039588 A * | 4/2013 | | F16D 13/52 |
| WO | 2006003285 A1 | 12/2006 | | |

* cited by examiner

CLUTCH ASSEMBLY

FIELD

The present invention relates to a clutch assembly, in particular for use in motor vehicles.

BACKGROUND

Clutch assemblies, in particular wet clutches, are known from the state of the art. Clutches are used in many types of vehicles to provide interruptible power transmission from a driving force, such as an engine, to a driven mechanism, such as wheels or chains. Mechanical clutches typically comprise clutch packs having separator plates and friction plates. These clutch packs are available in a variety of designs to provide an interruptible connection between a power source and a driven mechanism. When engaged, the clutch pack is forced together such that the clutch elements rotate in unison, causing the power source to drive the driven mechanism. When released, the clutch pack is opened. More specifically, the friction plates, which may be connected to the driven element, are removed from engagement with the separator plates, which generally remain rotating at the speed of the power source.

Typically, a clutch piston for forcing the clutch pack together is provided. The clutch piston is typically a rigid component and the elasticity in a clutch pack is provided by the friction material. Due to a non-uniform contact pressure distribution within the clutch pack, a wet clutch actuation may lead to noise emission.

SUMMARY

It is an object of the present invention to provide a clutch assembly that addresses the aforementioned problem. In particular, it may be an object of the present invention to provide a clutch pack that reduces noise emission and/or provides an improved clutch engagement, i.e smooth shift quality.

According to the invention, at least one object may be achieved by a clutch assembly with the features of the main claim. Advantageous designs and further developments of the invention are to be deduced from the features of the dependent claims and the following description.

A clutch assembly is provided. The clutch assembly comprises
  an axially slidable first plate,
  an axially fixed second plate disposed opposite the first plate,
  a clutch pack arranged between the first plate and the second plate,
  an actuator axially movable between a first position and a second position, wherein, in the first position, the clutch pack is opened and, in the second position, the clutch pack is closed and the friction plates are frictionally engaged,
  a return spring configured to bias the actuator in a direction away from the clutch pack towards the first position, and
  an engagement spring element configured to exert an elastic force on the clutch pack.

The clutch pack comprises a plurality of axially slidable consecutively arranged friction plates and separator plates. In particular, the friction plates and separator plates are arranged alternately, such that a friction plate is typically followed by a separator plate, followed by another friction plate, followed by a separator plate, etc.

When the clutch pack is opened, the friction plates and separator plates are typically not engaged and may rotate independently.

The clutch pack, in particular the friction plates and separator plates, is typically arranged along a clutch axis. The first plate and the second plate may be arranged along the same axis, in particular along the clutch axis, sandwiching the clutch pack. The first plate may be axially slidable along the clutch axis, wherein the second plate is typically axially fixed.

In one embodiment, the actuator is configured to push the first plate against the clutch pack. The actuator may, for example, be arranged axially adjacent to the first plate, especially on a side of the first plate that faces away from the second plate. In a first position, the actuator may not contact the first plate, while in the second position the actuator may contact the first plate, applying a force onto the first plate. In the second position, the actuator may push the first plate towards the second plate, thereby compressing the clutch pack to be in the closed position.

The return spring may be a compression or tension spring. In an embodiment, the return spring may be a helical spring, a leaf spring, a disc spring, a torsion spring, or another type of spring.

The engagement spring element may be a compression or a tension spring. In one embodiment, the engagement spring element may be a helical spring, a leaf spring, a disc spring, a torsion spring, or another type of spring. In one embodiment the engagement spring may be an elastomer.

The elastic force exerted on the clutch pack by the engagement spring element typically comprises an elastic axial force and an elastic shear force.

In one embodiment, the engagement spring element is configured to exert the elastic force on the clutch pack via the first plate. In particular, the engagement spring element may be disposed adjacent to the first plate contacting the first plate, at least when the actuator is in the second position. The engagement spring element may be mounted on the actuator. In particular, the engagement spring element may be mounted on the actuator such that, during an actuator's movement from the first to the second position, the engagement spring element does not contact the first plate in a first position and starts contacting the first plate from a certain actuator position between the first and the second position of the actuator.

The engagement spring element may be arranged between the actuator and the first plate. Additionally or alternatively, the engagement spring element may be arranged between the clutch pack and the second plate. This may allow for a compact design of the clutch assembly.

In one embodiment, the engagement spring element or a part of the engagement spring element may be an integral part of the actuator. Additionally or alternatively, the engagement spring element or a part of the engagement spring element may be an integral part of the second plate. This may simplify a manufacture process or an assembly process of the clutch assembly.

The engagement spring element may comprise a plurality of spring elements. Some of these spring elements or all of these spring elements may be arranged between the friction plates and the separator plates of the clutch pack.

In one embodiment, the friction plates are at least partially covered with a friction material. The elasticity of the engagement spring element is preferably higher than the elasticity of the friction material of the friction plates.

In one embodiment, the actuator comprises a recess. The engagement spring element may be at least partially arranged inside the recess of the actuator. The recess of the actuator may be arranged centrally with respect to the clutch axis. In another embodiment, the recess may be arranged radially offset to the clutch axis. A centered recess may be advantageous in that an engagement element spring disposed in the recess may provide a uniformly distributed force on the clutch pack.

In one embodiment, the engagement spring element may be an elastically formable material layer. The material layer may be an (axy-)symmetric pattern. In particular, the material layer may be a durable, oil and temperature resistant elastomer, e.g. FKM. The material layer preferably provides predetermined spring/damper characteristics. The engagement spring element may be configured as a spring element between two stiff components of the actuator or the second plate.

The "elastic engagement element" characteristics may be determined by (axi-symmetric) FEA clutch modelling (especially considering combined contact pressure and temperature distribution).

Properties of the material may be determined by endurance and compatibility requirements (i.e life).

In a preferred embodiment, the clutch assembly is a wet clutch assembly. The wet clutch assembly may comprise a clutch pack immersed in a fluid, typically in a cooling lubricating fluid. This may be advantageous as the fluid may keep the surfaces clean and may provide smoother performance and longer life. In alternative embodiments, the clutch assembly is a dry clutch assembly.

In one embodiment, the actuator may be a piston. The piston may be controlled by oil pressure. The clutch assembly may comprise one or more conduits for receiving oil and one or more valves to actuate the actuator hydraulically. The actuator may be moved from the first to the second position hydraulically. The actuator may be moved from the second to the first position hydraulically. One or more springs may support a hydraulic movement of the piston.

In alternative embodiments, the piston may be controlled mechanically, pneumatically, electrically or magnetically.

The clutch assembly may comprise a housing. The clutch assembly may include a drive shaft connected to a power source. The clutch housing may be rotatable with respect to the shaft, and may be connected to a driven mechanism. A rotation axis of the drive shaft may define the clutch axis. The friction plates and separator plates may be frictionally engageable to connect the housing to the drive shaft. When engaged, the clutch may provide a direct connection between the power source and the driven mechanism. When the clutch is opened, the drive shaft can rotate independently of the clutch housing.

The separator plates and/or the friction plates may be rotationally fixed but axially movable within the housing, while the friction plates and/or the separator plates may be rotationally movable and/or axially fixed. In a preferred embodiment, the friction and the separator plates are rotationally fixed, for example by connecting the the friction and the separator plates with a spline to one of two corresponding (rotating) parts that need to be synchronized.

In one embodiment, the separator plates may be rotationally fixed to the housing but axially movable within the housing, and/or the friction plates may be rotatably fixed but axially movable in a frame structure. The frame structure may be rotatable with respect to the clutch housing. The frame structure may be rotatable about the shaft via bearings, while the housing may be fixed to the shaft.

DETAILED DESCRIPTION

Figure 1:
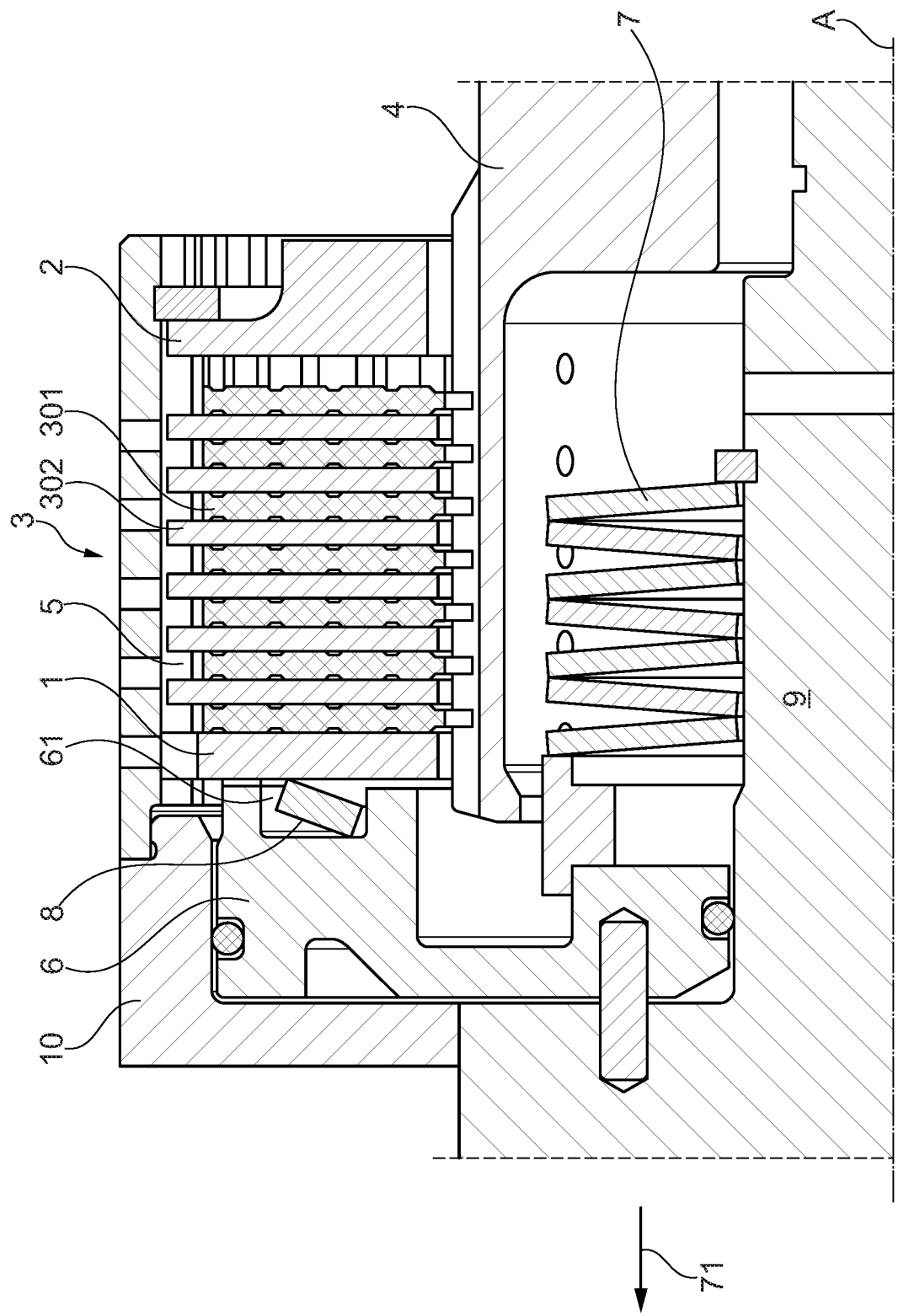
FIG. 1 shows a section view of an exemplary wet clutch assembly with an engagement spring.

In FIG. 1, a wet clutch assembly is illustrated in a sectional view. The clutch assembly comprises a first plate 1 and a second plate 2. A clutch pack 3 is arranged between the first and the second plate. The first plate 1 and the second plate 2 have an annular shape and are arranged centered to a clutch axis A. The clutch pack 3 comprises a plurality of axially slidable, consecutively arranged friction plates 301 and separator plates 302. The friction plates 301 are rotationally fixedly coupled to a shaft 4, for example, via internal splines engaged with external splines of the shaft. The friction plates 301 have friction surfaces to increase the coefficient of friction. The friction surfaces may comprise graphite, carbon fiber, organic, powder metallurgic, aramid fiber and/or ceramic materials. The separator plates 302 are interlocked with a clutch drum 5. The separator plates 302 may comprise steel (or essentially equivalent materials). An actuator 6 is arranged adjacent to the first plate 1 such that the actuator may push the first plate towards the second plate, thereby compressing the clutch pack 3 such that the separator plates 302 and the friction plates 301 engage frictionally. The actuator 6 may be actuated hydraulically by oil pressure.

As shown in FIG. 1, the actuator 6 is a piston. When actuated, the piston of the clutch needs to first move a certain distance to close all the clearances. The zero clearance point is called the kiss point. No torque is transferred yet, as no contact pressure exists between the friction plates 301 and separator plates 302. Then, the pressure is gradually increased to increase the torque transfer. As such, the rotational speeds of the friction plates 301 and the separator plates 302 are synchronized. When frictionally engaged, the clutch drum 5 and the shaft 4 may rotate with the same speed. When synchronized, the pressure may be further increased to prevent slipping. At this point, typically, the clutch is said to be closed.

The shaft 4 may be a hollow shaft. A return spring 7 applies a spring pressure onto the actuator 6 to disengage the friction plates. The return spring 7 pushes the actuator 6 away from the clutch pack 3 in a direction shown by arrow 71. The return spring may be arranged in a cavity of the hollow shaft 4.

The actuator comprises a recess 61 pointing towards the first plate 1. An engagement spring 8 is arranged in the recess for applying a pressure onto the first plate. This leads to a more uniform distribution of the contact pressure between the friction plates 301 and separator plates 302. Further, the elasticity in the clutch is not a requirement of the friction material anymore, and more efficient or typically less elastic friction materials can be selected in comparison with a wet clutch without engagement spring.

Due to the engagement spring 8, the kiss point may be less discrete. As such, clutch tuning may be simplified and possibly also the calibration interval may be extended. A less sensitive kiss point may improve shifting quality by reducing torque variations in case of kiss point errors.

Typically, a proportional valve is used to provide oil pressure for actuating the actuator 6. The proportional valve requires a certain flow rate for a qualitative pressure control. Typically, an accumulator is mounted between the clutch and the proportional valve to absorb that flow. With the engagement spring 8, this accumulator could be downsized or eliminated.

The actuator 6 and the return spring 7 are coupled to a shaft 9 disposed in the hollow shaft (Hub) 4. The clutch drum 5 is coupled to a housing 10 coupled to the shaft 9. Hub 4 is supported by shaft 9 via bearings but rotationally not coupled.

The clutch is a wet clutch. The wet clutch is cooled by lubrication oil that flows through grooves in the friction material of the friction plates 301 when the wet clutch is closed. In open condition, the lubrication oil can flow in between the separator plates 302 and friction plates 301.

In open condition, the lubrication oil reduces touching of the friction plates 301 and the separator plates 302 and thus reduces power loss by friction, namely clutch drag. Nevertheless, some clearance is needed between the separator plates 302 and friction plates 301 in open condition.

Figure 2:
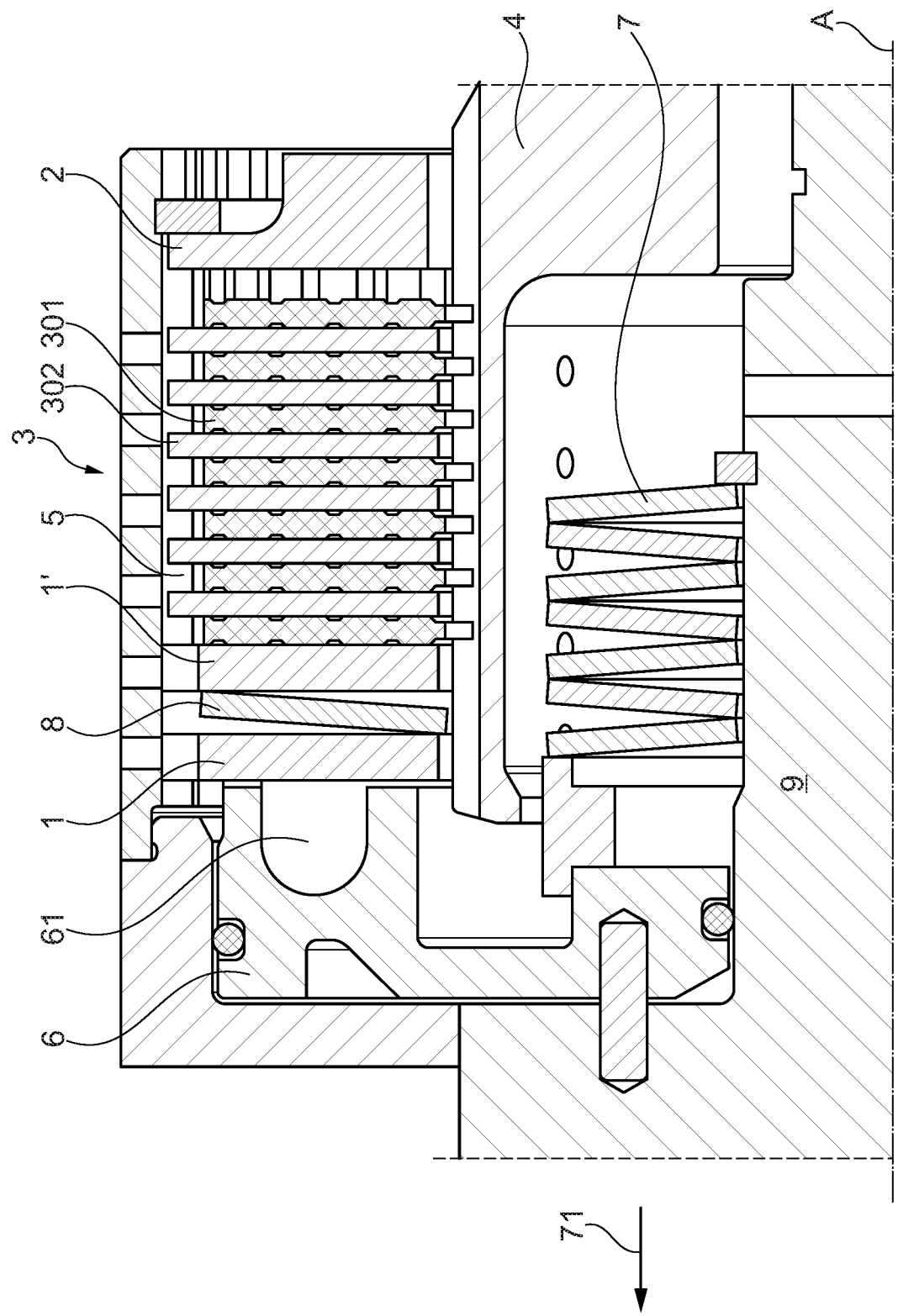
FIG. 2 shows a section view of another example of a wet clutch with an engagement spring variant.

FIG. 2 shows a clutch assembly in a sectional view. The clutch assembly is essentially similar to the clutch assembly of FIG. 1, wherein the piston 6 and an engagement spring assembly comprising the engagement spring 8' have a different design.

The clutch assembly comprises a first plate 1 and a second plate 2. A clutch pack 3 is arranged between the first and the second plate 1, 2. The first plate 1 and the second plate 2 have an annular shape and are arranged centered to a clutch axis A. The clutch pack 3 comprises a plurality of axially slidable, consecutively arranged friction plates 301 and separator plates 302. The friction plates 301 are rotationally fixedly coupled to a shaft 4, for example via internal gears engaged with external gears of the shaft. The friction plates 301 have friction surfaces to increase the coefficient of friction. The friction surfaces may comprise graphite, carbon fiber, organic, powder metallurgic, aramid fiber and/or ceramic materials. The separator plates 302 are interlocked with a clutch drum 5. The separator plates 302 may comprise steel (or essentially equivalent materials). An actuator 6 is arranged adjacent to a plate 1' such that the actuator may push the plate 1' towards the second plate 2, thereby compressing the clutch pack 3 such that the separator plates 302 and the friction plates 301 engage frictionally. The actuator 6 may be actuated hydraulically by oil pressure.

The operation of the actuator corresponds to the operation of the actuator shown in FIG. 1, which is referenced here.

The shaft 4 is a hollow shaft. The return spring 7 applies a spring pressure onto the actuator 6 to disengage the friction plates. The return spring 7 pushes the actuator 6 away from the clutch pack 3 in a direction shown by arrow 71. The return spring may be arranged in a cavity of the hollow shaft 4.

An engagement spring 8 is arranged between the plate 1' and the first plate 1, the first plate 1 being arranged adjacent to the clutch pack 3 for applying a pressure onto the clutch pack. The engagement spring 8 of FIG. 2 is a (waved or conical) steel spring or elastomeric element positioned between the 1' and the first plate 1. The first plate 1 is slidably arranged between the engagement spring 8 and the clutch pack 3. The force applied onto the clutch pack 3 via plate 1 leads to a more uniform distribution of the contact pressure between the friction plates 301 and separator plates 302. Further, the elasticity in the clutch is not a requirement of the friction material anymore, and more efficient or stiffer friction materials can be selected in comparison with a wet clutch without engagement spring.

Due to the engagement spring 8, the kiss point may be less discrete. As such, clutch tuning may be simplified and possibly also the calibration interval may be extended. A less sensitive kiss point may improve shifting quality by reducing torque variations in case of kiss point errors.

Figure 3:
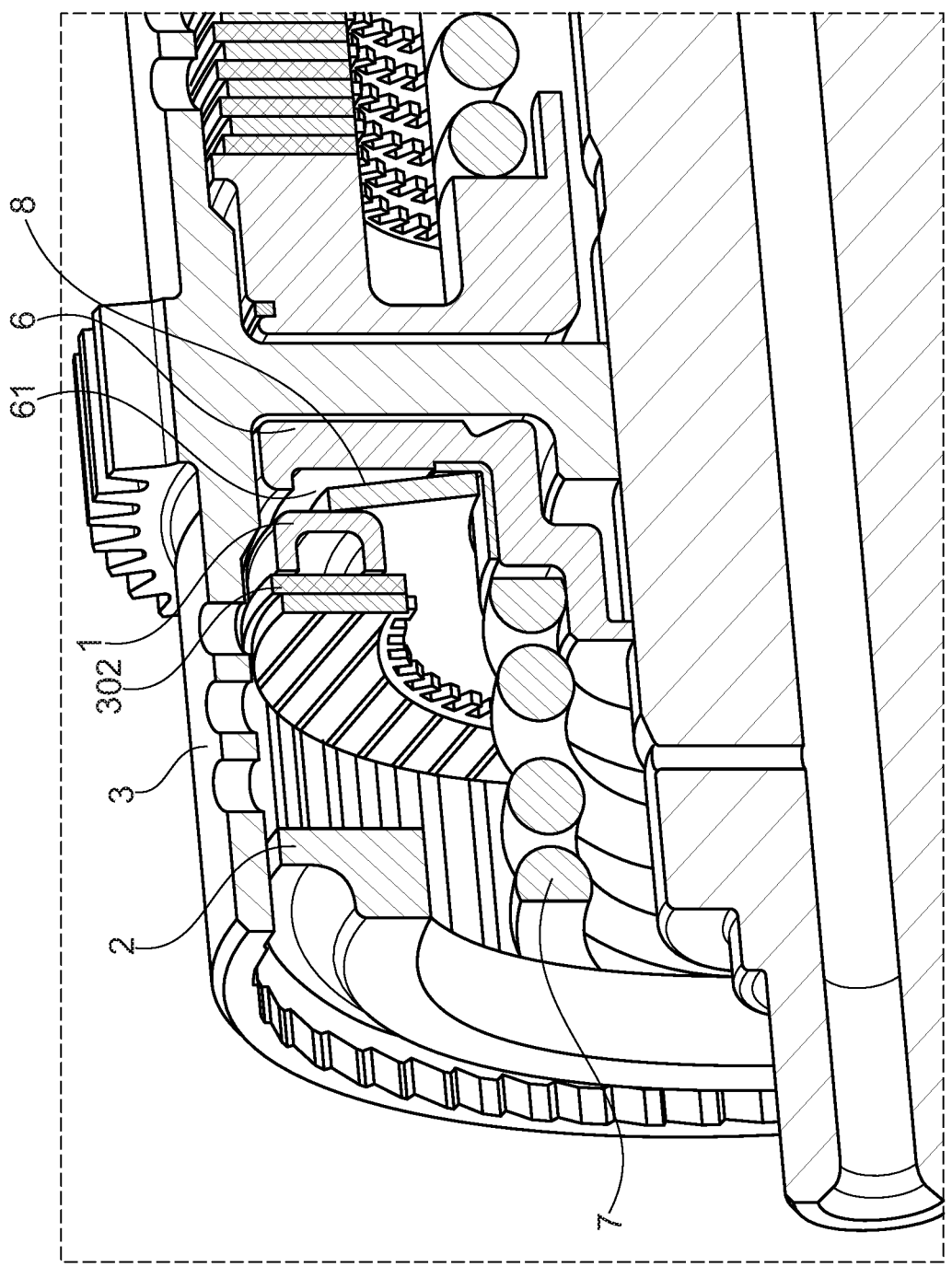
FIG. 3 shows a section view of another example of a wet clutch with an engagement spring variant.

In FIG. 3, a variant of the clutch pack of the aforementioned figures is shown. The same reference signs were used for recurring features. The engagement spring of FIG. 3 is arranged in a recess 61 formed in the actuator 6. For illustration purposes, only one separator plate 302 of the clutch pack 3 is illustrated, wherein the design of the clutch pack 3 corresponds to that of the previous figures including a plurality of separator plates 302 and friction plates 301. The engagement spring 8 applies a force onto the clutch pack 3 via the first plate 1. The first plate 1 of FIG. 3 comprises a u-shaped part. The engagement spring 8 applies a force onto the u-shaped part 1 that transmits the force onto the clutch pack. When the actuator 8 is moved towards the clutch pack 3, the return spring 7 is compressed and the actuator 6 applies a force onto the u-shaped part 1 to compress the clutch pack 3.

Figure 4:
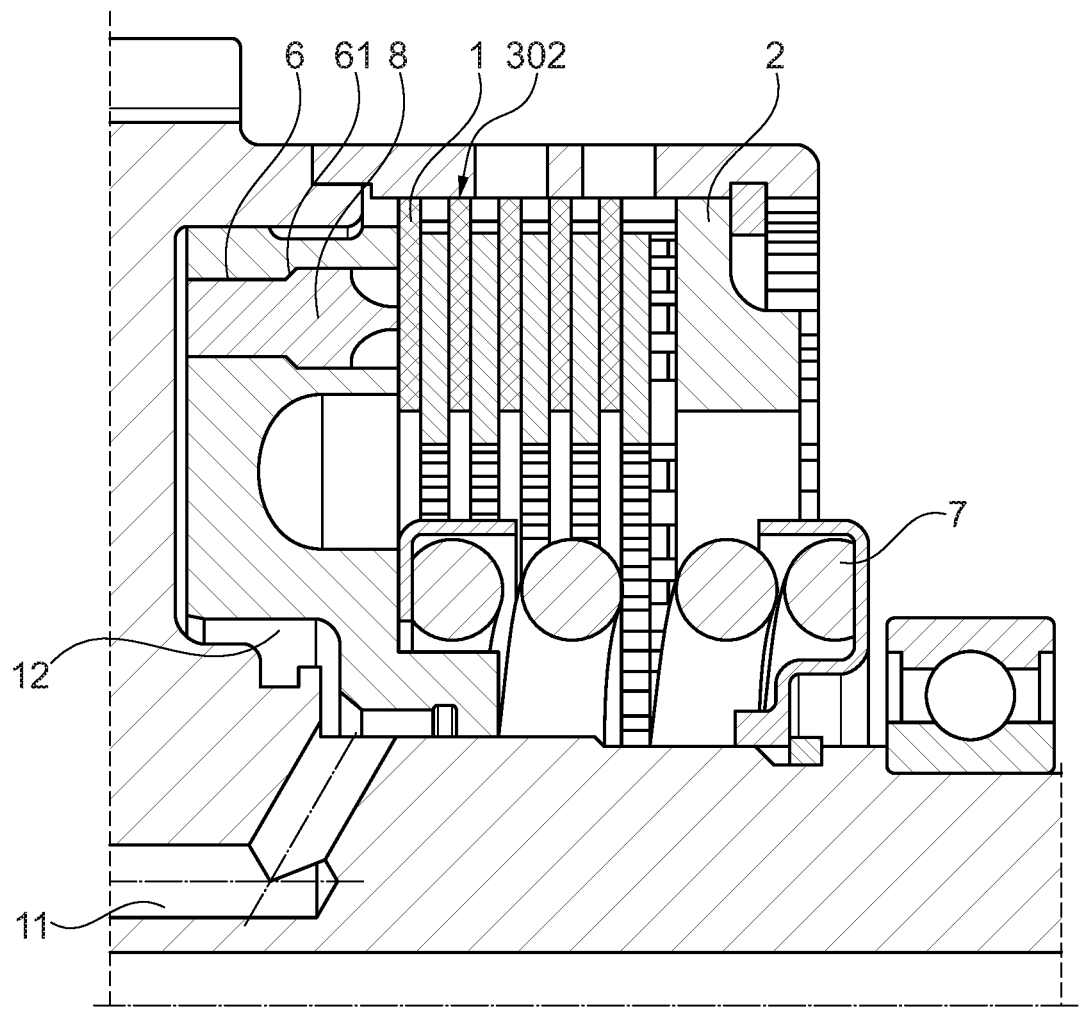
FIG. 4 shows a section view of another example of a wet clutch with another engagement spring variant.

In FIG. 4, a variant of the clutch pack of the aforementioned figures is shown. The clutch assembly of FIG. 4 is essentially similar to the clutch assembly of FIG. 1, wherein the engagement spring 8 is an elastomer arranged in the recess 61 of the actuator 6. The same reference signs were used for recurring features. Due to the engagement spring 8, in FIG. 4 being an engagement elastomer, the kiss point is less discrete. As such, clutch tuning is simplified and the configuration interval can be extended. A less sensitive kiss point improves shifting quality by reducing torque variations in case of kiss point errors. A simple hydraulic circuit can be used. Expensive hydraulic components such as accumulators or complex control strategies can be removed and this will benefit the overall cost efficiency of a transmission.

The clutch assemblies of FIGS. 1-3 have a longer extension along the axis A compared to the clutch assembly of FIG. 4. Thus, the design of FIG. 4 allows for a more compact clutch assembly. In FIG. 4, a hydraulic conduit 11 is shown. A fluid, in particular oil, can be inserted into a sealed recess 12 in which the actuator 6 is located to operate the actuator 6.

The clutch assemblies shown in FIGS. 1-4 are wet clutch assemblies. The wet clutch is cooled by lubrication oil that flows though grooves in the friction material when the wet clutch is closed. In open condition, the lubrication oil can flow in between the plates. In open condition the lubrication oil has a second function: it reduces touching of the friction plates and the separator plates and thus reduces power loss by friction, namely clutch drag. Nevertheless, some clearance is needed between the plates in open condition.

What is claimed:
1. A clutch assembly, comprising:
an axially slidable first plate, wherein said first plate comprises a u-shaped part,
an axially fixed second plate disposed opposite the first plate,
a clutch pack arranged between the first plate and the second plate, wherein the clutch pack comprises a plurality of axially slidable consecutively arranged friction plates and separator plates,
an actuator axially movable between a first position and a second position, wherein, in the first position, the clutch pack is opened and, in the second position, the clutch pack is closed and the friction plates are frictionally engaged, a return spring configured to bias the actuator in a direction away from the clutch pack towards the first position, an engagement spring element configured to exert an elastic force on the clutch pack, and wherein the elastic force exerted on the clutch pack by the engagement spring element comprises an elastic axial force and an elastic shear force.

2. The clutch assembly of claim 1, wherein the engagement spring element is configured to exert the elastic force on the clutch pack via the first plate.

3. The clutch assembly of claim 1, wherein, in the second position, the actuator is configured to push the first plate against the clutch pack.

4. The clutch assembly of claim 1, wherein the friction plates are at least partially covered with a friction material.

5. The clutch assembly of claim 4, wherein the friction plates are at least partially covered with the friction material and the elasticity of the engagement spring element is higher than the elasticity of the friction material of the friction plates.

6. The clutch assembly of claim 5, wherein the engagement spring element is at least partially arranged inside a recess of the actuator.

7. The clutch assembly of claim 1, wherein the engagement spring element is arranged between the actuator and the first plate.

8. The clutch assembly of claim 1, wherein the engagement spring element is arranged between the clutch pack and the second plate.

9. The clutch assembly of claim 1, wherein the engagement spring element is an integral part of the actuator.

10. The clutch assembly of claim 8, wherein the engagement spring element is configured as an elastically formable material layer of at least one of an elastomer and a spring element between two stiff components of the actuator or the second plate.

11. The clutch assembly of claim 1, wherein the engagement spring element is an integral part of the second plate.

12. The clutch assembly of claim 1, wherein the engagement spring element comprises a plurality of spring elements arranged between the friction plates and the separator plates of the clutch pack.

13. The clutch assembly of claim 1, wherein the clutch assembly is a wet clutch assembly or a dry clutch assembly.

14. The clutch assembly of claim 1, wherein the actuator is a piston controlled mechanically or pneumatically or electrically or magnetically or hydraulically.

* * * * *